Patented June 27, 1933

1,915,955

UNITED STATES PATENT OFFICE

PETER SCHLÖSSER, OF BRESLAU, KURT BARTSCH, OF IDA NEAR SAARAU, AND GERHARD KÄLLNER, OF MARIENHUTTE NEAR SAARAU, GERMANY, ASSIGNORS TO SILESIA VEREIN CHEMISCHER FABRIKEN, OF IDA AND MARIENHUTTE NEAR SAARAU, GERMANY

PROCESS OF PREPARING MERCAPTOBENZOTHIAZOLE

No Drawing. Application filed June 1, 1931, Serial No. 541,542, and in Germany June 11, 1930.

The present invention relates to the preparation of thiazoles, particularly 1-mercaptobenzothiazole.

It is known to prepare 1-mercaptobenzothiazole by heating a mixture of 1 mol. of aniline, 1 mol. of sulphur and 1 mol. of carbon bisulphide, plus 15–20% excess of the latter, in an autoclave at 280–285° C. (vide British Specification No. 283,679). The resulting crude product is purified by dissolving in alkali lye and precipitating with hydrochloric acid. According to another proposal (British Specification No. 283,661) aniline, sulphur and carbon bisulphide are also employed as starting materials, but an attempt is made to prevent side reactions by causing the reaction to proceed from the beginning in a definite reaction by the addition of aqueous or gaseous ammonia, whereby ammonium phenyldithiocarbamate is first formed.

According to this invention, it has been found that satisfactory yields as in the case of the above mentioned processes (95%) may be obtained in a simple manner by heating molecular quantities of aniline, sulphur and carbon bisulphide at a temperature of only 200° C. allowing the mixture to stand for 18–24 hours at said temperature and under a hydrogen sulphide pressure of about 50 atmospheres.

It has been further found, according to this invention, that satisfactory yields of pure, odourless 1-mercaptobenzothiazole may be obtained directly from the melt, by introducing the hot contents of the autoclave under pressure and with stirring into a hydrocarbon mixture which is not completely free from the acid and basic constituents (phenols, pyridine etc). For example, a mixture of about 5% phenolic bodies and about 1% pyridine bases is used, having an initial boiling point of 135 to 140° C. For example, if 330 kg. of the hot melt at 200° C. are introduced while stirring into 400 kg. of unwashed solvent naphtha II having a boiling point of 150 to 180° C. or into an artificially prepared mixture of middle runnings from the distillation of benzol at about 140° C. and containing about 5% of phenolic bodies and 1% of pyridine bases, and if the temperature of the mixture is adjusted at about 80 to 110°, 1-mercaptobenzothiazole immediately commences to separate out in small yellow crystals having a melting point of 174 to 179° C. The crystals may be isolated by suctional filtration or centrifuging. The resulting product is entirely pure and dry, light in color and odourless. The presence of phenols and/or pyridine bases is essential, since it is not possible, for example with xylene or correspondingly high boiling middle runnings, alone to obtain light and odourless products.

The process illustrated above in connection with 1-mercaptobenzothiazole may, of course, be applied to the preparation of other thiazoles obtainable in a similar manner.

We claim:

1. Process of preparing 1-mercaptobenzothiazole comprising heating a mixture of 1 mol. of aniline, 1 mol. of sulphur and 1 mol. of carbon bisulphide, in an autoclave, at a temperature of about 200° C. and under a raised hydrogen sulphide pressure of about 50 atmospheres, forcing the hot contents of the autoclave into a cold mixture of hydrocarbons of the benzole series, the said mixture having an initial boiling point of 135–140° C. and being not completely free from acid and basic constituents.

2. Process of preparing 1-mercaptobenzothiazole comprising heating a mixture of 1 mol. of aniline, 1 mol. of sulphur and 1 mol. of carbon bisulphide in an autoclave at a temperature of 200° C. and under a raised hydrogen sulphide pressure of about 50 atmospheres, forcing the hot contents of the autoclave into a cold mixture of hydrocarbons of the benzole series, said mixture having a boiling point of 135–140° C. and containing about 5% of phenol and 1% of pyridine.

In testimony whereof we affix our signatures.

PETER SCHLÖSSER.
KURT BARTSCH.
GERHARD KÄLLNER.